(12) United States Patent
Lin et al.

(10) Patent No.: US 9,562,926 B2
(45) Date of Patent: Feb. 7, 2017

(54) MICRO-ELECTRO-MECHANICAL SYSTEM (MEMS) DEVICE INCLUDING AN INTERNAL ANCHOR AREA

(71) Applicants: Chiung-Wen Lin, Changhua (TW); Chiung-Cheng Lo, Miaoli (TW); Yu-Fu Kang, Taipei (TW)

(72) Inventors: Chiung-Wen Lin, Changhua (TW); Chiung-Cheng Lo, Miaoli (TW); Yu-Fu Kang, Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 14/708,140

(22) Filed: May 8, 2015

(65) Prior Publication Data

US 2016/0169927 A1 Jun. 16, 2016

(30) Foreign Application Priority Data

Dec. 12, 2014 (CN) .......................... 2014 1 0767464

(51) Int. Cl.
*G01P 15/00* (2006.01)
*G01P 15/18* (2013.01)
*G01P 15/125* (2006.01)
*G01P 15/08* (2006.01)

(52) U.S. Cl.
CPC ............. *G01P 15/18* (2013.01); *G01P 15/125* (2013.01); *G01P 2015/082* (2013.01)

(58) Field of Classification Search
CPC ............................ G01P 1/00; G01P 2015/082
See application file for complete search history.

(56) References Cited

U.S. PATENT DOCUMENTS

| | | | | |
|---|---|---|---|---|
| 5,349,855 A | * | 9/1994 | Bernstein | G01C 19/5719 73/504.16 |
| 6,257,059 B1 | * | 7/2001 | Weinberg | G01C 19/5719 73/504.16 |
| 6,509,670 B2 | * | 1/2003 | Jeong | H02N 1/008 310/309 |
| 7,267,005 B1 | * | 9/2007 | Kranz | G01C 19/5719 73/504.12 |
| 9,046,367 B2 | * | 6/2015 | Su | G01C 19/5747 |
| 2003/0131664 A1 | * | 7/2003 | Mochida | G01C 19/5719 73/504.12 |

(Continued)

*Primary Examiner* — Harshad R Patel
*Assistant Examiner* — Samir M Shah
(74) *Attorney, Agent, or Firm* — Tung & Associates (57) ABSTRACT

The invention provides an MEMS device. The MEMS device includes: a substrate, a proof mass, a spring, a spring anchor, a first electrode anchor, and a second electrode anchor, a first fixed electrode and a second fixed electrode. The proof mass is connected to the substrate through the spring and the spring anchor. The proof mass includes a hollow structure inside, and the spring anchor, the first electrode anchor, and the second electrode anchor are located in the hollow structure. The proof mass and the first fixed electrode form a first capacitor, and the proof mass and the second fixed electrode form a second capacitor. There is neither any portion of the proof mass nor any portion of any fixing electrode located between the first electrode anchor, second electrode anchor, and the spring anchor.

11 Claims, 6 Drawing Sheets

(56) References Cited

U.S. PATENT DOCUMENTS

| | | | |
|---|---|---|---|
| 2006/0010978 A1* | 1/2006 | Lee | G01C 19/5747 73/504.02 |
| 2006/0117852 A1* | 6/2006 | Park | G01P 15/0888 73/504.16 |
| 2009/0272189 A1* | 11/2009 | Acar | G01C 19/574 73/504.16 |
| 2010/0295138 A1* | 11/2010 | Montanya Silvestre | B81C 1/00246 257/415 |
| 2010/0307241 A1* | 12/2010 | Raman | G01C 19/56 73/504.12 |
| 2011/0154898 A1* | 6/2011 | Cazzaniga | G01C 19/5747 73/504.12 |
| 2012/0272711 A1* | 11/2012 | Supino | G01C 25/005 73/1.38 |
| 2013/0167635 A1* | 7/2013 | Su | G01C 19/5747 73/504.12 |
| 2016/0131679 A1* | 5/2016 | Hsu | G01P 15/125 73/504.12 |

* cited by examiner

MICRO-ELECTRO-MECHANICAL SYSTEM (MEMS) DEVICE INCLUDING AN INTERNAL ANCHOR AREA

CROSS REFERENCE

The present invention claims priority to CN 201410767464.5, filed on Dec. 12, 2014.

BACKGROUND OF THE INVENTION

Field of Invention

The present invention relates to a micro-electro-mechanical system (MEMS) device, especially an MEMS device including an internal anchor area and a multi-dimensional spring.

Description of Related Art

Figure 1:
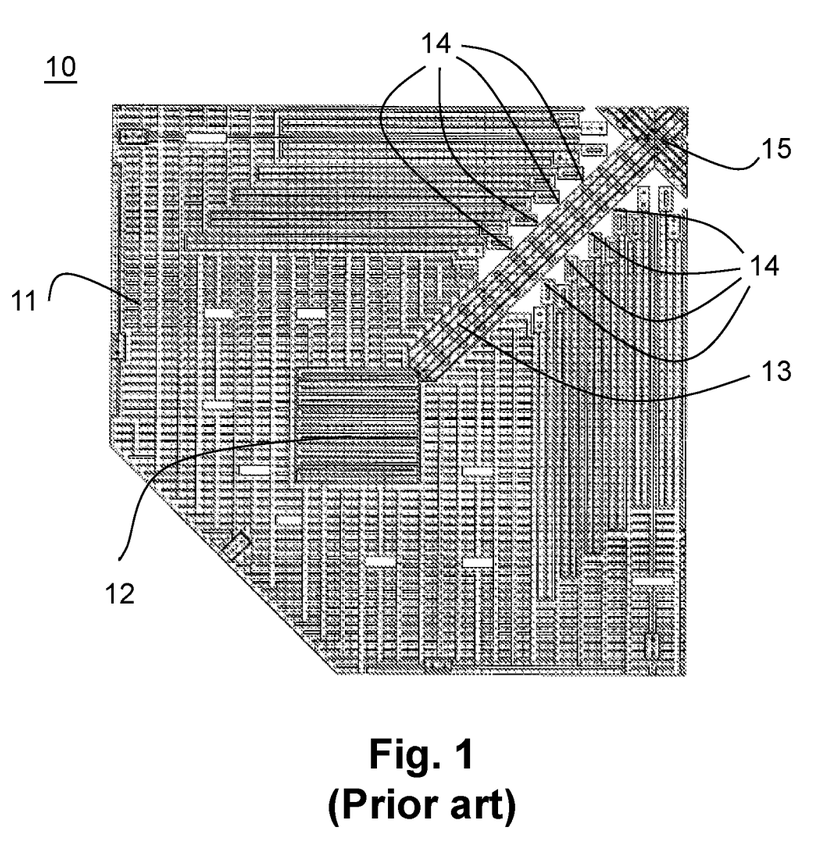
FIGS. 1, 2, and 3 show three prior art MEMS devices.

MEMS devices have become common in our daily life; one typical function of the MEMS devices is for motion sensing. FIG. 1 shows a prior art MEMS device 10 disclosed in U.S. Pat. No. 6,892,576, wherein only one fourth of the MEMS device 10 is shown and the rest three fourths are symmetrical. A proof mass 11 is connected to a substrate (not shown) through multiple springs 12, multiple linkages 13, and multiple anchors 15. Sensing electrodes are connected to the substrate through multiple anchors 14. In this prior art, the linkage 13 requires anchors 15 so that it can be connected to the substrate without distortion, and the center of the proof mass 11 as well as the anchors 15 need to be close to a multiple anchors 14. Under these limitations, the layout and manufacturing process of the structure are quite complicated.

Figure 2:
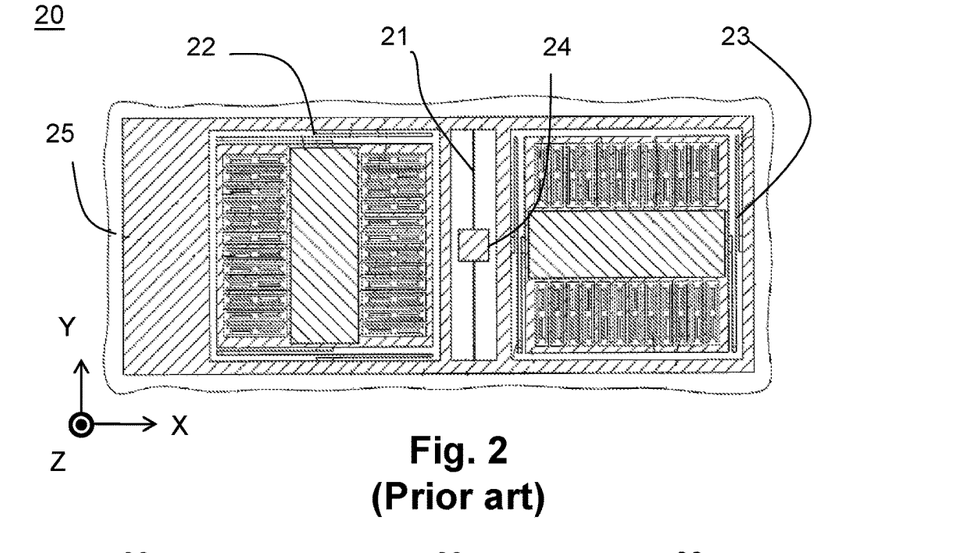

FIG. 2 shows another prior art MEMS device 20 disclosed in U.S. Pat. No. 8,333,113, wherein three springs 21, 22, and 23 (with different moving directions) are respectively connected to different proof masses. The MEMS device 20 includes an anchor 24 which is connected to the substrate 25. In this prior art, each spring and each proof mass requires an individual structure. Thus, the merit of single proof mass for 3-axis sensing may not be accomplished easily.

Figure 3:
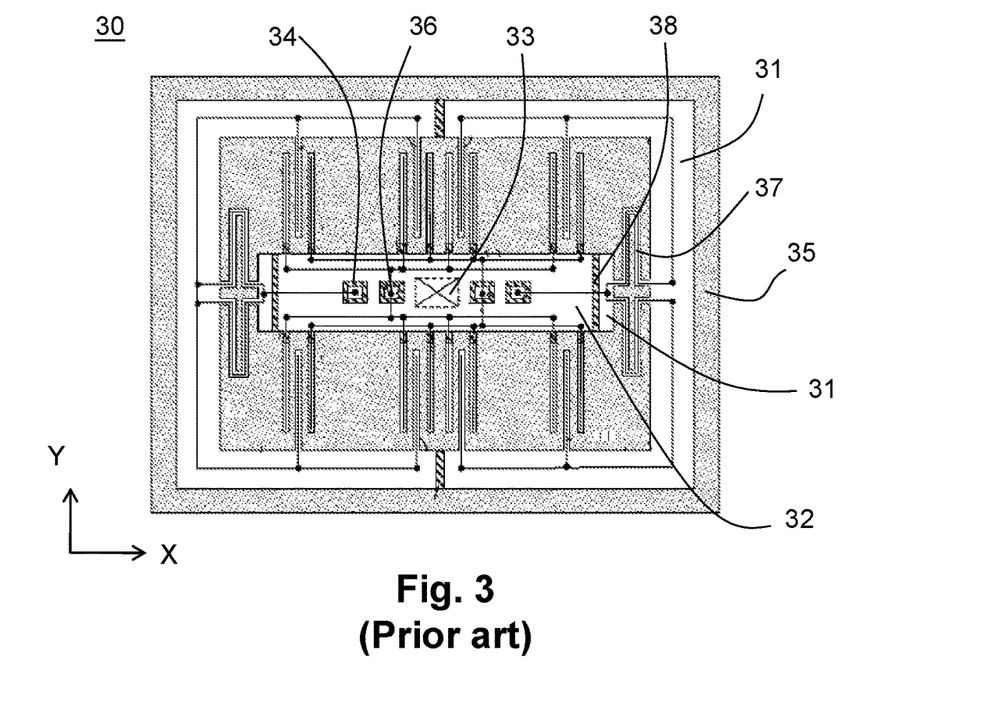

FIG. 3 shows another prior art MEMS device 30 disclosed in U.S. Pat. No. 8,610,222, which includes proof masses 31 and a fixing part 32 (both shown by the white regions), wherein the outer proof mass 31 is connected to the inner proof mass 31 through multiple springs 37, and the inner proof mass 31 and the fixing part 32 are connected as one part. For avoiding a short circuit between the proof mass 31 and the fixing part 32, an insulation structure 38 is provided between the inner proof mass 31 and the fixing part 32. The proof mass 31 is connected to the substrate 35 through anchors 34, and the fixing part 32 is connected to the substrate 35 through the anchors 33. In this prior art, the layout of the anchors is so arranged that the anchors 33, 34, and 36 are located near a central area of the proof mass 31, so as to minimize the offset due to deformation. However, the insulation structure between the proof mass 31 and the fixing part 32 substantially increases the manufacturing complexity and reduces the strength of the structure. Generally, the proof masses, the fixing part, and the springs are made of same material, and the sacrificial layers surrounding these parts are made of an insulating material such as an oxide. The proof masses and the springs are released by etching the insulating material. Therefore, if an insulation structure needs to remain in the final MEMS device, this will greatly increase the complexity of the manufacturing process. Besides, the reliability issue of the product must be taken care of.

In view of the drawbacks of the prior art MEMS devices, the present invention provides an MEMS device having an anchor layout capable of minimizing the offset due to deformation, without the need of complicated process to manufacture.

SUMMARY OF THE INVENTION

In one perspective, the present invention provides an MEMS device including: a substrate; a proof mass, including a first movable electrode and a second movable electrode for sensing movements along first and second directions, wherein the proof mass further includes a hollow space inside; a spring, a spring anchor, a first electrode anchor, and a second electrode anchor, which are located in the hollow space, wherein the proof mass is connected to the substrate through the spring and the spring anchor; and a first fixed electrode and a second fixed electrode, respectively connected to the substrate through the first electrode anchor and the second electrode anchor, the first fixed electrode and the first movable electrode forming a first capacitor, and the second fixed electrode and the second movable electrode forming a second capacitor, wherein the first capacitor and the second capacitor are used for sensing a movement of the proof mass; wherein there is neither any portion of the proof mass nor any portion of any fixing electrode connected between the spring and the spring anchor.

In one embodiment, the first movable electrode and the second movable electrode are located at a same side or different sides of the spring anchor, and the first movable electrode and the second movable electrode are not directly connected to each other.

In one embodiment, the first fixed electrode and the first movable electrode form a plurality of first capacitors which form at least one first differential capacitor, and the second fixed electrode and the second movable electrode form a plurality of second capacitors which format least one second differential capacitor.

In one embodiment, the proof mass further includes a third movable electrode for sensing movements along a third direction perpendicular to the first and second directions, and the MEMS device further includes a third fixed electrode forming a third capacitor with the third movable electrode.

In one embodiment, the movement of the proof mass includes an eccentric movement.

In one embodiment, the spring anchor is located in the middle of the spring, and the spring includes at least two sections each of which includes a first end and a second end, the first end being connected to the spring anchor, the second end being connected to the proof mass, whereby the proof mass can perform an in-plane rotation with respect to a plane formed by the first and second directions and an out-of-plane rotation with respect to the plane formed by the first and second directions.

In one embodiment, the hollow space includes an internal anchor area which accommodates the first electrode anchor, the second electrode anchor, and the spring anchor therein, and an area size of the internal anchor area occupies less than 5% of a total area size defined by a peripheral of the proof mass.

In one embodiment, the first electrode anchor is connected to the first fixed electrode at a portion of the first fixed electrode which is closest to the spring anchor, and/or the second electrode anchor is connected to the second fixed electrode at a portion of the second fixed electrode which is closest to the spring anchor.

In one embodiment, the mass of the proof mass is unevenly distributed at two sides of the spring anchor.

In one embodiment, there is neither any portion of the proof mass nor any portion of any fixing electrode connected between the first electrode anchor, the second electrode anchor, and the spring anchor.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, o show the interrelations between the layers or parts, but not drawn according to actual scale. The orientation wordings in the description such as: above, under, left, or right, etc. are for reference with respect to the drawings, but not for limiting the actual product made according to the present invention.

Figure 4:
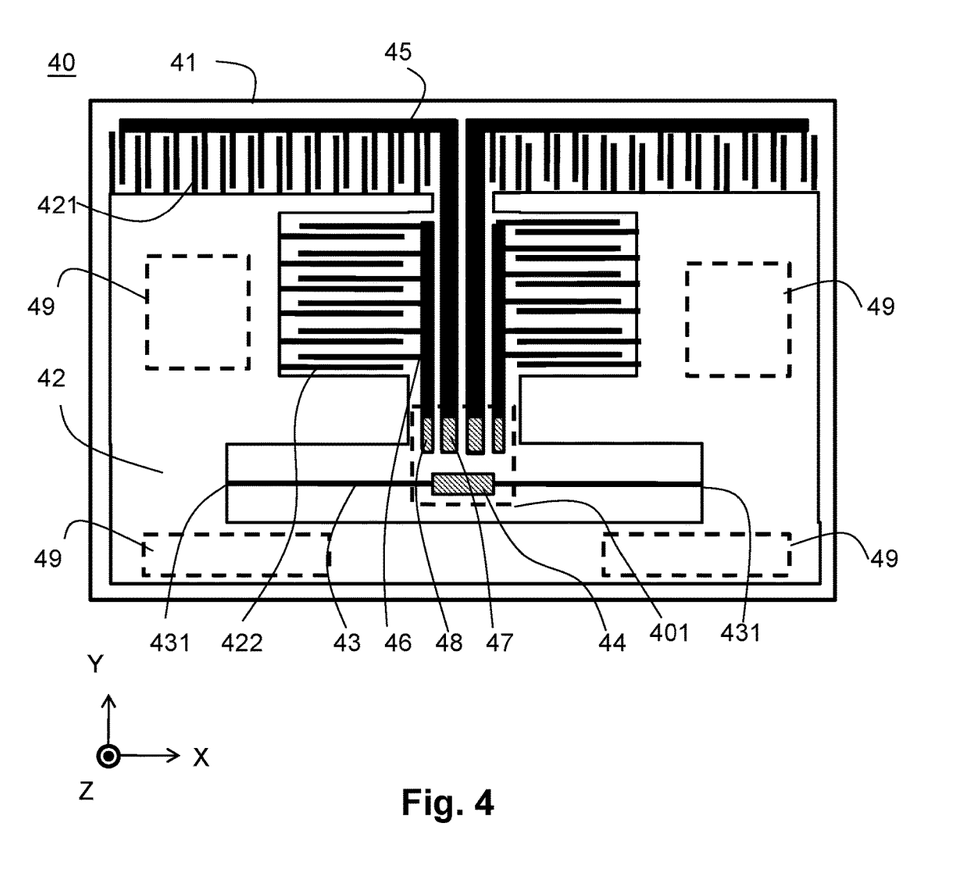
FIG. 4 shows an MEMS device according to one embodiment of the present invention.

FIG. 4 shows an MEMS device 40 according to the present invention. The MEMS device 40 includes: a substrate 41; a proof mass 42; and at least one first fixed electrode 45 and at least one second fixed electrode 46. The proof mass 42 includes at least one first movable electrode 421 and at least one second movable electrode 422 for sensing movements along different directions (such as but not limited to X-direction and Y-direction). The proof mass 42 further includes a hollow space inside, and the proof mass 42 is connected to the substrate 41 through a multi-dimensional spring 43 and a spring anchor 44 located inside the hollow space, wherein there is neither any portion of the proof mass 42 nor any portion of any fixing electrode located between the multi-dimensional spring 43 and the spring anchor 44. The first fixed electrode 45 and the second fixed electrode 46 are respectively connected to the substrate 41 through the first electrode anchor 47 and the second electrode anchor 48 which are located in the hollow space of the proof mass 42, the first fixed electrode 45 and the first movable electrode 421 forming a first capacitor, and the second fixed electrode 46 and the second movable electrode 422 forming a second capacitor. In one embodiment, there is neither any portion of the proof mass 42 nor any portion of any fixing electrode connected between the first electrode anchor 47, the second electrode anchor 48, and the spring anchor 44. The first capacitor and the second capacitor are used for sensing a movement of the proof mass. In one embodiment, there are pairs of first capacitors forming differential capacitors and pairs of second capacitors forming differential capacitors. Note that the terms "first" and "second" are used merely for representing different sensing directions but not implying anything regarding sizes or sequences.

In one embodiment, the hollow space of the proof mass includes one single internal anchor area 401, which accommodates the first electrode anchor 47, the second electrode anchor 48, and the spring anchor 44 therein; the area size of the internal anchor area 401 occupies less than 5% of the total area size (including the solid material area and the hollow space area) defined by a peripheral of the proof mass.

In one embodiment, the first electrode anchor 47 is connected to the first fixed electrode 45 at a portion of the first fixed electrode 45 which is closest to the spring anchor 44, and/or the second electrode anchor 48 is connected to the second fixed electrode 46 at a portion of the second fixed electrode 46 which is closest to the spring anchor 44.

Figure 6:
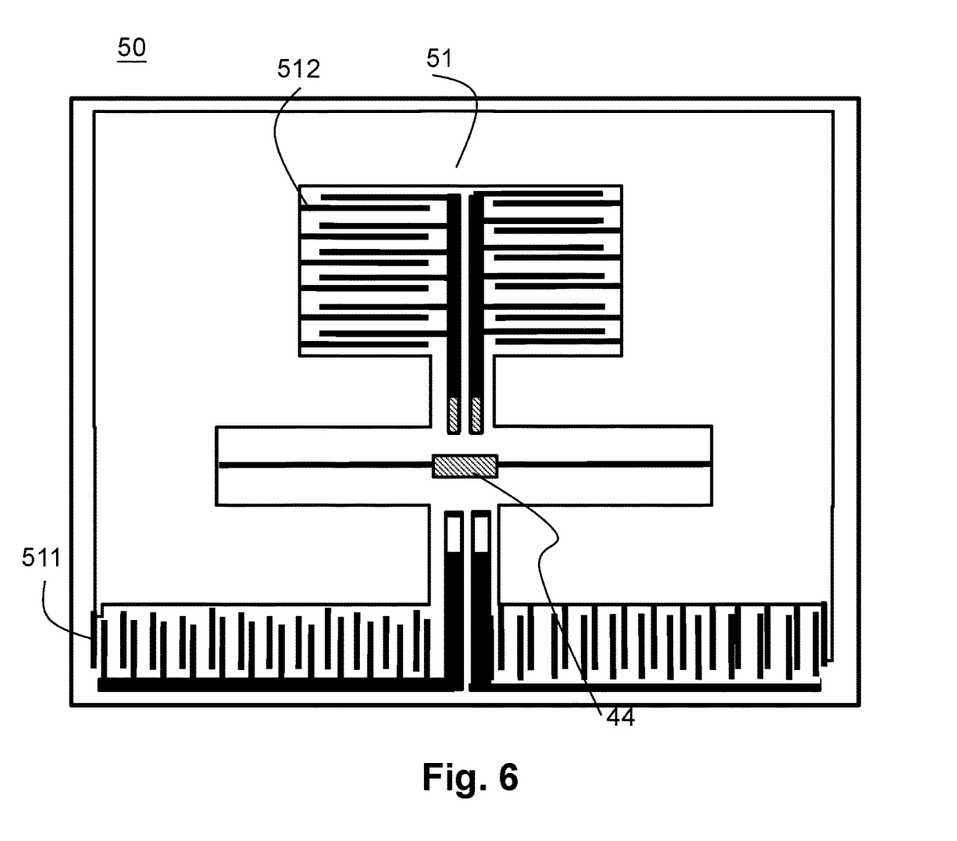
FIG. 6 shows an MEMS device according to another embodiment of the present invention.

In one embodiment, the first movable electrode 421 and the second movable electrode 422 are located at a same side of the spring anchor 44, and the first movable electrode 421 and the second movable electrode 422 are not directly connected to each other. Referring to FIG. 6, in another embodiment, the first movable electrode 511 and the second movable electrode 512 are located at different sides of the spring anchor 44, and the first movable electrode 511 and the second movable electrode 512 are not directly connected to each other.

Figure 5A:
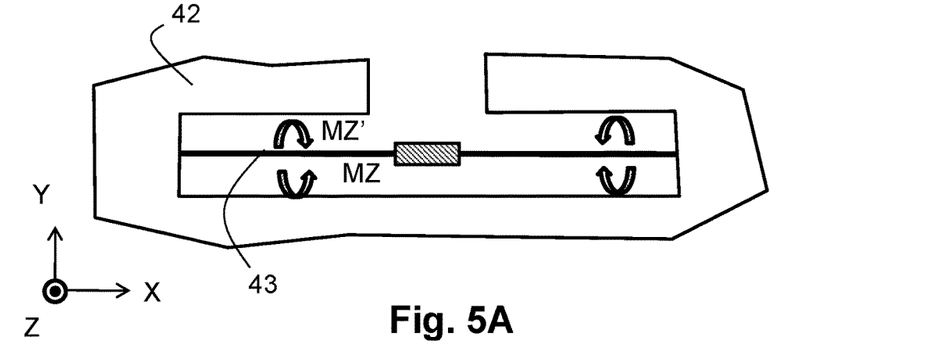
FIGS. 5A, 5B, and 5C illustrate movements of the multi-dimensional spring according to the present invention.
Figure 5B:
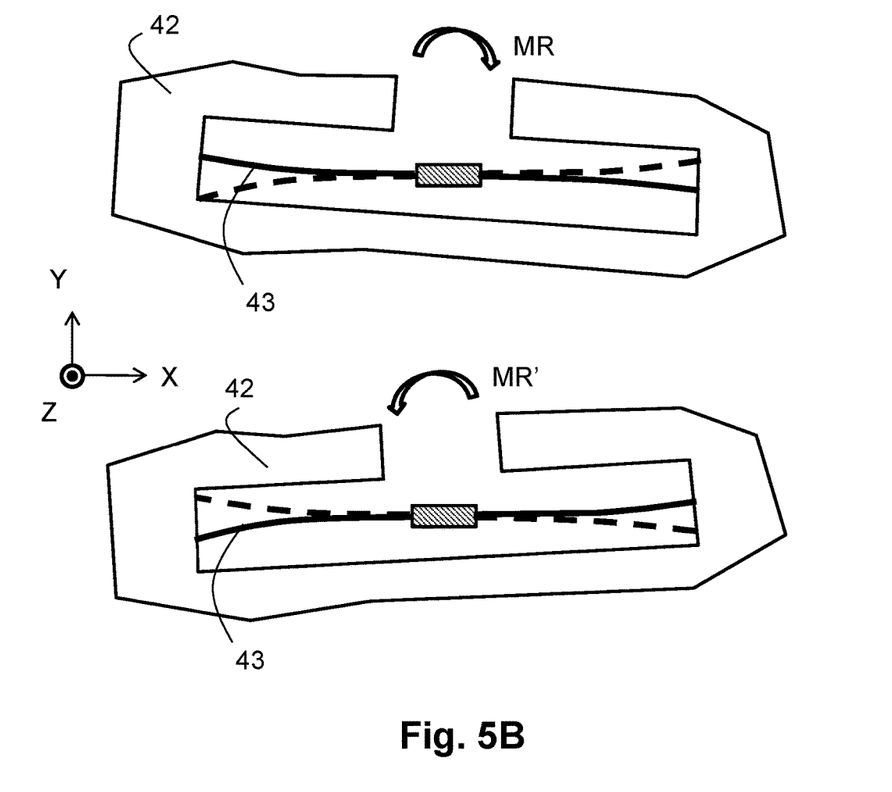
Figure 5C:
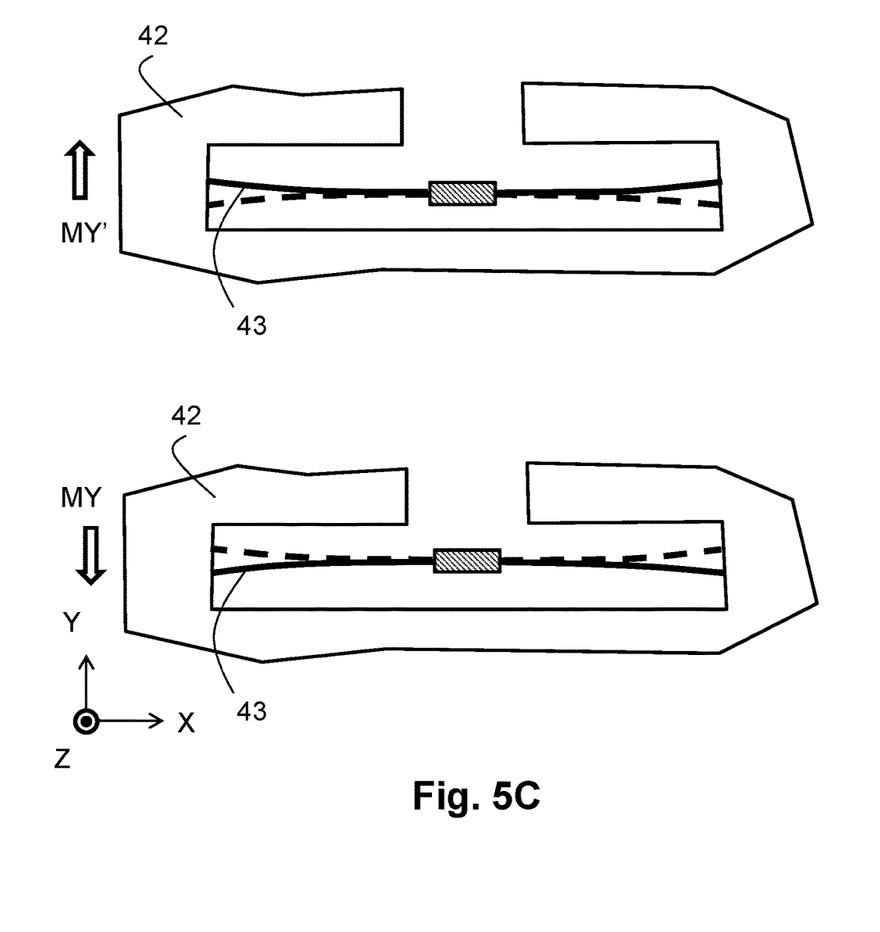

In one embodiment, the mass of the proof mass 42 of FIG. 4 (or the proof mass 51 of FIG. 6) is unevenly distributed at two sides of the spring anchor 44 such that the proof mass 42 (or the proof mass 51) can perform an eccentric movement. The eccentric movement for example includes: in-plane (with respect to X-Y plane) rotations MR and MR' (FIG. 5B), one-dimensional (e.g. with respect to Y-direction) in-plane translation movement MY and MY' (FIG. 5C), and Z-direction out-of-plane (with respect to X-Y plane) rotations MZ and MZ' (FIG. 5A).

In one embodiment, the proof mass 42 further includes a third movable electrode 49 for sensing movements along another direction (for example, Z-direction) perpendicular to the sensing directions (for example, X-direction and Y-direction) of the first movable electrode 421 and the second movable electrode 422, and the MEMS device 40 further includes a third fixed electrode (located at a corresponding position above or below the third movable electrode 49) forming a third capacitor with the third movable electrode 49, to sense the movement of the proof mass 42. In one embodiment, there can be multiple third capacitors forming one or more pairs of differential capacitors.

In one embodiment, the multi-dimensional spring 43 for example can have, but is not limited to, a linear shape. The spring anchor 44 is located at the middle of the multi-dimensional spring 43. From another point of view, it can be regarded as that the multi-dimensional spring 43 includes two sections each of which has one end connected to the spring anchor 44 and another end connected to the proof mass 42 at a connecting point 431. The multi-dimensional spring 43 is preferably a spring with a capability of multi-dimensional elastic movements. Please refer to FIGS. 5A, 5B, and 5C; in one embodiment, the multi-dimensional spring 43 can perform the in-plane rotations MR and MR', the translation movements MY and MY', and the out-of-plane rotations MZ and MZ'. In comparison with the prior art MEMS devices, although the multi-dimensional spring 43 of the present invention has a linear shape, it is capable of performing multi-dimensional elastic movements; the linear shape can save more space than the complicated spring structure in the prior art. In another embodiment, the multi-dimensional spring can be connected to the proof mass 42 at more than two connecting points, and in this case the proof mass 42 performs less rotations but more translational movements. The connection between the proof mass and the multi-dimensional spring is not limited to the aforementioned embodiments and can be designed as required.

The layout of MEMS device according to the present invention is superior to the prior art MEMS devices at least in reduced offset due to deformation, less structure complexity, and simpler manufacturing process.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the MEMS device of the present invention does not have to sense three-dimensional movements; for example, the present invention can be applied to sensing only one-dimensional movements or two-dimensional movements, and the corresponding movable electrodes and fixed electrodes in the non-sensing directions can be omitted. Correspondingly, the "multi"-dimensional spring is only required to perform a one-dimensional or two-dimensional elastic movement or rotation. An embodiment or a claim of the present invention does not need to attain or include all the objectives, advantages or features described in the above. The abstract and the title are provided for assisting searches and not to be read as limitations to the scope of the present invention.

What is claimed is:

1. An MEMS device, comprising:
   a substrate;
   a proof mass, including a first movable electrode and a second movable electrode for sensing movements along first and second directions, respectively, wherein the proof mass further includes a hollow space inside;
   a spring, a spring anchor, a first electrode anchor, and a second electrode anchor, which are located in the hollow space, wherein the proof mass is connected to the substrate through the spring and the spring anchor; and
   a first fixed electrode and a second fixed electrode, respectively connected to the substrate through the first electrode anchor and the second electrode anchor, the first fixed electrode and the first movable electrode forming a first capacitor, and the second fixed electrode and the second movable electrode forming a second capacitor, wherein the first capacitor and the second capacitor are used for sensing movements of the proof mass along the first and second directions, respectively;
   wherein there is neither any portion of the proof mass nor any portion of any fixing electrode connected between the spring and the spring anchor.

2. The MEMS device of claim 1, wherein the first movable electrode and the second movable electrode are located at a same side of the spring anchor, and the first movable electrode and the second movable electrode are not directly connected to each other.

3. The MEMS device of claim 1, wherein the first movable electrode and the second movable electrode are located at different sides of the spring anchor, and the first movable electrode and the second movable electrode are not directly connected to each other.

4. The MEMS device of claim 1, wherein the first fixed electrode and the first movable electrode form a plurality of first capacitors which form at least one first differential capacitor, and the second fixed electrode and the second movable electrode form a plurality of second capacitors which form at least one second differential capacitor.

5. The MEMS device of claim 1, wherein the proof mass further includes a third movable electrode for sensing movements along a third direction perpendicular to the first and second directions, and the MEMS device further includes a third fixed electrode forming a third capacitor with the third movable electrode.

6. The MEMS device of claim 1, wherein the movements of the proof mass include an eccentric movement.

7. The MEMS device of claim 1, wherein the spring anchor is located in the middle of the spring, and the spring includes at least two sections each of which includes a first end and a second end, the first end being connected to the spring anchor, the second end being connected to the proof mass, whereby the proof mass can perform an in-plane rotation with respect to a plane formed by the first and second directions and an out-of-plane rotation with respect to the plane formed by the first and second directions.

8. The MEMS device of claim 1, wherein the hollow space includes an internal anchor area which accommodates the first electrode anchor, the second electrode anchor, and the spring anchor therein, and an area size of the internal anchor area occupies less than 5% of a total area size defined by a periphery of the proof mass.

9. The MEMS device of claim 1, wherein the first electrode anchor is connected to the first fixed electrode at a portion of the first fixed electrode which is closest to the spring anchor, and/or the second electrode anchor is connected to the second fixed electrode at a portion of the second fixed electrode which is closest to the spring anchor.

10. The MEMS device of claim 1, wherein the mass of the proof mass is unevenly distributed at two sides of the spring anchor.

11. The MEMS device of claim 1, wherein there is neither any portion of the proof mass nor any portion of any fixing electrode connected between the first electrode anchor, the second electrode anchor, and the spring anchor.

* * * * *